United States Patent [19]
Moyer et al.

[11] Patent Number: 5,893,142
[45] Date of Patent: Apr. 6, 1999

[54] DATA PROCESSING SYSTEM HAVING A CACHE AND METHOD THEREFOR

[75] Inventors: William C. Moyer, Dripping Springs; John Arends; Lea Hwang Lee, both of Austin, all of Tex.

[73] Assignee: Motorola Inc., Austin, Tex.

[21] Appl. No.: 748,855

[22] Filed: Nov. 14, 1996

[51] Int. Cl.⁶ .................................................. G06F 13/00
[52] U.S. Cl. ......................... 711/125; 711/137; 711/144
[58] Field of Search ................................. 395/381, 383; 711/125, 144, 137

[56] References Cited

U.S. PATENT DOCUMENTS

| | | | |
|---|---|---|---|
| 4,763,253 | 8/1988 | Bluhm et al. | 395/383 |
| 5,371,865 | 12/1994 | Aikawa et al. | 711/125 |
| 5,511,178 | 4/1996 | Takeda et al. | 711/125 |
| 5,535,360 | 7/1996 | Cassetti | 711/140 |
| 5,666,505 | 9/1997 | Bailey | 395/383 |

OTHER PUBLICATIONS

J. Bunda, "Instruction Processing Optimization Techniques for VLSI Microprocessors," PhD thesis Deptartment of Computer Science, Univ. of Texas, Austin, Chapter 7, May, 1993, pp. 95–114.

Ramesh Panwar and David Rennels, "Reducing the frequency of tag compares for low power I–cache design," 1995 Intl. Symposium on Low Power Design, Dana Point, CA, Apr., 1995, pp. 57–62.

J. Thornton, "Design of a Computer: CDC 6600" Scot Foresman, Publisher: Glenview II, 1970, pp. 12–15, 110–141, 173–175.

Andra Seznec, "Decoupled Sectored Caches: conciliating low tag implementation cost and low miss ratio," Proc IEEE 21st Intl. Symposium on Computer Architecture, Jun. 1994, pp. 384–392.

Ching–Long Su and Alvin M. Despain, "Cache Designs for Energy Efficiency," 28th Hawaii International Conf. on System Sciences, Jan. 1995.

Dake Liu and Christer Svensson, "Power Consumption Estimation in CMOS VLSI Chips," Journal of Solid State Circuits, vol. 29, No. 6, Jun. 1994, pp. 663–670.

Ching–Long Su and Alvin M. Despain, "Cache Design Trade–offs for Power and Performance Optimization: A Case Study," 1995 Intl. Symp. Low Power Design, Dana Point, CA, pp. 63–68.

Kiyoo Itoh, Katsuro Sasaki, and Yoshinobu Nakagone, "Trends in Low–Power RAM Circuit Technologies," '94 Symp. on Low Power Electronics, San Diego, CA, Oct. 1994, pp. 84–87.

John Bunda, W. C. Athas and Don Fussell, "Evaluating Power Implications of CMOS Microprocessor Design Decisions," Intl Workshop on Low Power Design, Napa Valley, CA, Apr., 1994, pp. 147–152.

*Primary Examiner*—Tod R. Swann
*Assistant Examiner*—Conley B. King, Jr.
*Attorney, Agent, or Firm*—Daniel D. Hill

[57] ABSTRACT

A data processing system (20) has a cache (26) that does not use a TAG array for storing a TAG address as in a conventional cache. The cache (26), according to one embodiment, uses a state machine (30) for transitioning the cache (26) to an active state in response to a change of flow instruction which is a short backward branch instruction of a predetermined displacement. The predetermined displacement is less than the number of entries in the cache (26), so the cache can remain active as long as the program is in a loop which can be contained entirely within the cache. A look ahead feature for the valid bit array is provided that associates the valid bit for a current instruction with a previous instruction, such that during a read of the cache, the valid bit for a next instruction is checked with the same index used to read the current instruction.

24 Claims, 3 Drawing Sheets

DATA PROCESSING SYSTEM HAVING A CACHE AND METHOD THEREFOR

CROSS REFERENCE TO APPLICATION

A related application entitled "DISTRIBUTED TAG CACHE MEMORY SYSTEM AND METHOD FOR STORING DATA IN THE SAME", by William C. Moyer et al., and having U.S. Application Ser. No. 08/748,856, was filed concurrently herewith, and assigned to the assignee hereof.

FIELD OF THE INVENTION

This invention relates generally to data processing, and more particularly, to a cache in a data processing system and method therefor.

BACKGROUND OF THE INVENTION

Lower power consumption has been gaining importance in microprocessor and microcontroller design due to wide spread use of portable and handheld applications. A typical embedded control system will generally include a central processing unit (CPU) and a variety of different types of memory and peripheral devices. The different types of memory may be external to an integrated circuit having the microcontroller, and/or on the same integrated circuit, and may include cache memory, ROM (read only memory), and a variety of SRAM (static random access memory) devices.

A significant amount of energy and time is required to access a large external main memory. Therefore, a smaller, faster, and more efficient memory, sometimes referred to as a cache, may be used on the integrated circuit to reduce the number of accesses to the main memory. To keep the size of the integrated circuit as small as possible, only as much memory as is necessary is included onboard the integrated circuit.

A cache TAG is frequently used to increase the performance of the cache. The cache TAG receives a TAG address that is provided by the microprocessor and determines if the requested instructions and/or data are present in the cache memory. If a requested instruction is not located in the cache, the microprocessor must then retrieve the instruction from the main memory. When an instruction is written into the cache, the higher order bits of the address of the instruction are stored in a TAG array. The cache TAG also has a comparator that compares a processor generated address to the TAG address. If the TAG address and the processor generated address are the same, a cache "hit" occurs, and a match signal is provided by the cache TAG, indicating that the requested data is located in the cache memory. If the processor generated address and the TAG address are not the same, a cache "miss" occurs, and the match signal indicates that the requested data is not located in the cache memory. In addition, a valid bit may be set as a part of the TAG address for qualifying a valid hit of the stored TAG address during a compare cycle of the cache.

There may be several levels of hierarchy in the memory system of a high performance microprocessor in order to boost efficiency of instruction and data retrieval. Power consumed by the CPU to retrieve instructions and data is typically much higher when the instructions and data are fetched from another level in the memory system. Therefore, reducing the number of instruction fetches to another level of memory is desirable to reduce power consumption, especially in applications that are battery powered.

Also, some applications often spend a significant portion of their execution time on small program loops. An example of such an application would be an implementation of a filter for digital signal processing. Having to repeatedly access a main memory for all, or a part, of these instructions would have an adverse effect upon both power consumption and execution speed. Therefore, it would be desirable to reduce power consumption and increase execution speed associated with the execution of such small loops by avoiding the need to repeatedly access main memory, while at the same time, reducing the surface area required to implement the cache.

DESCRIPTION OF A PREFERRED EMBODIMENT

Generally, the present invention provides a data processing system having a cache. The cache is "TAGless", that is it does not use a TAG array for storing a TAG address as in a conventional cache. Also, a valid bit array is provided that associates the valid bit for a current instruction with a previous instruction, such that during a read of the cache, the valid bit for a next instruction is checked with the same index used to read the current instruction, thus providing a simple look ahead feature for the TAGless cache.

The cache, according to one embodiment, uses a state machine for transitioning the cache to an active state in response to a change of flow (COF) instruction which is a short backward branch (SSB) instruction of less than a predetermined displacement. The predetermined displacement is less than the number of entries in the cache, so the cache can remain active as long as the program is executing a loop which can be contained entirely within the cache. The cache memory, in accordance with the present invention, is useful for programs having tight, short loops that are reiterated a large number of times, such as for example, a filter function in a communications application. Because the cache is "TAGless", a TAG array and comparator are eliminated, requiring less surface area on an integrated circuit.

The present invention can be more fully described with reference to FIGS. 1–4. The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one.

Figure 1:
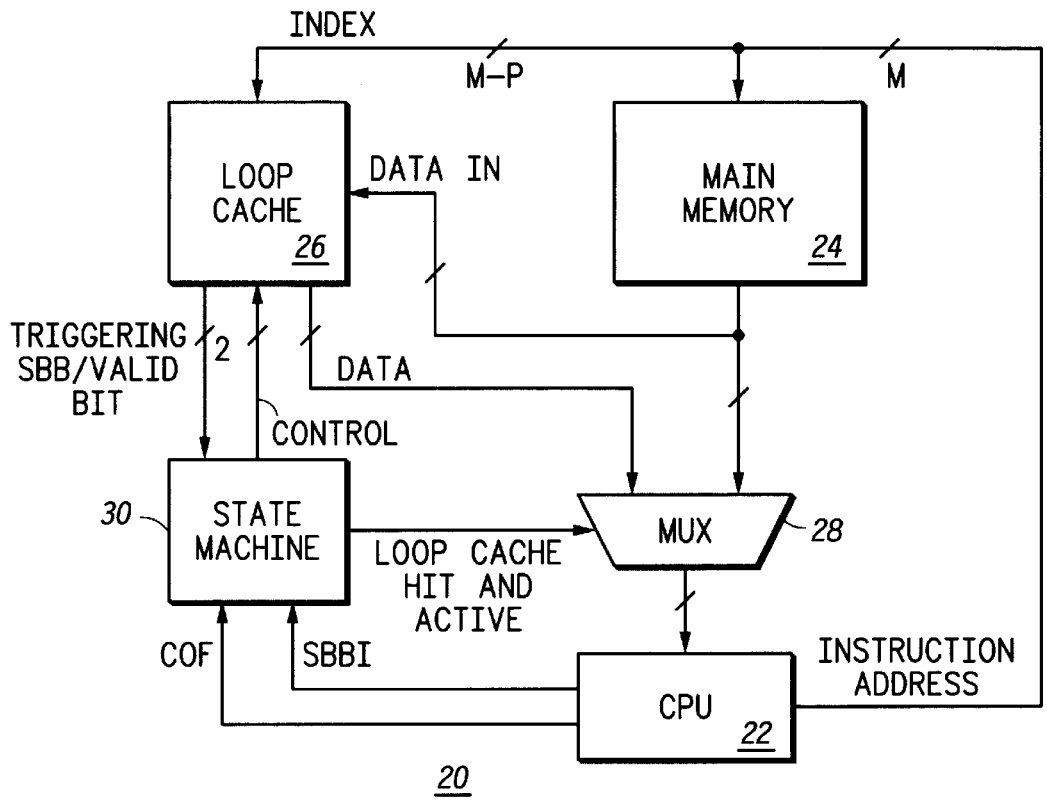
FIG. 1 illustrates, in block diagram form, a data processing system in accordance with the present invention.

FIG. 1 illustrates, in block diagram form, a data processing system 20 in accordance with the present invention. Data processing system 20 includes central processing unit (CPU) 22, main memory 24, TAGless loop cache 26, multiplexer 28, and state machine 30. Generally, CPU 22 generates a plurality of instruction addresses. The instruction addresses are provided to main memory 24 and loop cache 26. Each instruction address comprises M bits, where M is an integer. Only a portion of the M bits are provided to loop cache 26, as indicated by M-P, where P is an integer less than M, and represents a global TAG portion of an instruction address, and M-P is an INDEX portion. The global TAG portion is similar to the TAG address used in a conventional cache memory having a TAG array.

State machine 30 is used to determine and control which of the main memory 24 or loop cache 26 is to provide instructions to CPU 22. In response to the instruction address, main memory 24 or loop cache 26 provides an instruction, corresponding to the instruction address M, to CPU 22 via multiplexer 28. If main memory 24 supplies the instruction to CPU 22, the instruction labeled "DATA IN" is also supplied to loop cache 26. If the instruction is to be supplied by loop cache 26, as determined by state machine 30, the instruction, corresponding to instruction address M-P, and labeled "DATA" is provided to CPU 22. Note that in other embodiments, loop cache 26 may supply instructions to, for example, an alternate data processing or storage unit instead of to CPU 22.

In order to determine from where instructions are to be retrieved, state machine 30 receives a control signal labeled "COF" (change of flow) and a control signal labeled "SBBI" (short backward branch instruction). CPU 22 provides control signal COF to the state machine in response to determining that an instruction address is a non-sequential instruction address in a series of instruction addresses. Loop cache 26 provides two control bits to state machine 30. One of the control bits is labeled "TRIGGERING SSB" and the other control bit is labeled "VALID BIT". State machine 30 also provides a loop cache hit signal and an activation signal, labeled "LOOP CACHE HIT AND ACTIVE", for controlling multiplexer 28. State machine 30 provides other control signals, labeled "CONTROL", such as a read signal and a write signal for controlling the type of access to loop cache 26.

Loop cache 26 has two states: active and inactive. When loop cache 26 is active, data can be read from loop cache 26 and supplied to CPU 22 via multiplexer 28. When loop cache 26 is inactive, data is provided from main memory 24 to CPU 22 via multiplexer 28, and at the same time data can be provided from main memory 24 and written to loop cache 26. The manner in which loop cache 26 functions and responses to the various signals will be described later in more detail with reference to FIGS. 2–4.

State machine 30 uses control signals COF and SBBI to control loop cache 26 without the need for having a TAG array for storing TAG addresses. Data processing system 20 is most efficient when executing instructions that include loops that are repeated for many iterations, such as instructions for providing a filtering function in a communication system, or other computation intensive digital signal processing functions. Loop cache 26 is large enough to include all of the instructions of the loop so that the loop can be executed completely from within loop cache 26. When CPU 22 detects a loop that fits within loop cache 26, an instruction that determines the loop is marked, or indicated, with a triggering SBB bit. At that point, the next instruction is supplied to CPU 22 from TAGless loop cache 26. Since only the INDEX portion (M-P) of the instruction address is provided to loop cache 26, and the triggering SBB determines that CPU 22 is executing instructions from within the loop cache, the need for a TAG address and a separate TAG array in data processing system 20 is eliminated. Also, the need for a TAG compare cycle for every instruction retrieval is eliminated. In accordance with the illustrated embodiment, main memory 24 is accessed for instructions that are not within the loop, therefore, loop cache 26 is most useful for applications where most of the execution time is within tight loops that can be executed entirely from within loop cache 26.

By implementing a cache within a data processing system without using a TAG array, surface area of the integrated circuit is reduced, thus reducing the cost and complexity of the integrated circuit. In addition, power consumption is reduced in the data processing system because accesses to a TAG array are eliminated.

Figure 2:
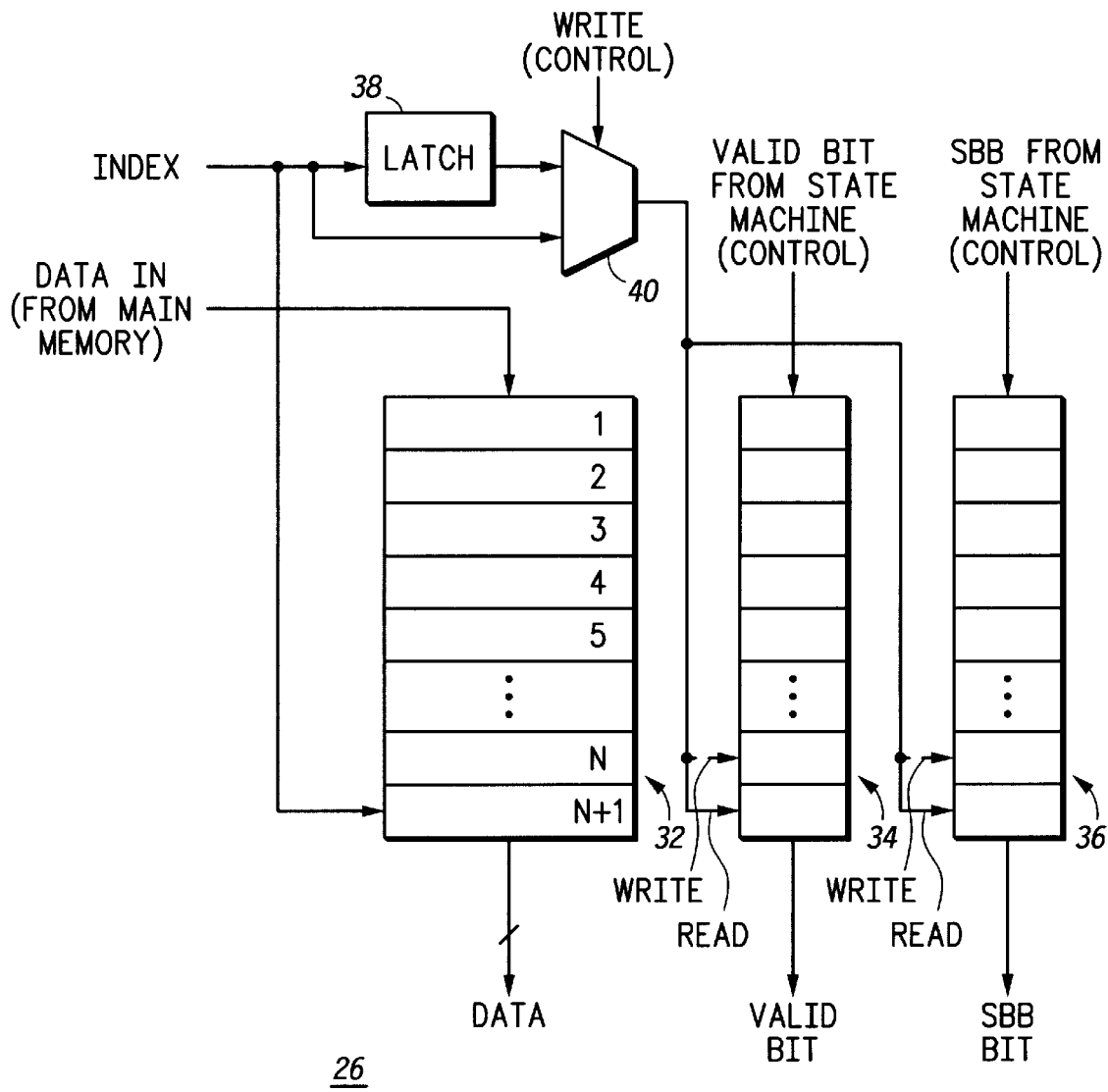
FIG. 2 illustrates in block diagram form, the loop cache of FIG. 1.

FIG. 2 illustrates loop cache 26 of FIG. 1 in more detail. Loop cache 26 is illustrated in FIG. 2 as having 3 sections: a first section 32 for storing instructions labeled "DATA IN"; a second section 34 for storing a valid bit corresponding to each of the instructions contained in first section 32; and a third section 36 for storing the short backward branch (SBB) bit received from state machine 30. Loop cache 26 also includes latch 38 and multiplexer 40. Latch 38 has a plurality of input terminals for receiving the INDEX portion of the instruction address and a plurality of output terminals coupled to a first plurality of input terminals of multiplexer 40. A second plurality of input terminals of multiplexer 40 also receive the INDEX potion. A plurality of output terminals of multiplexer 40 is used to address second section 34.

Second section 34 has an output terminal for providing a VALID BIT in response to receiving the INDEX from the output of multiplexer 40. First section 32 has a plurality of input terminals for receiving the instructions from the main memory and a plurality of output terminals for providing instructions in response to receiving the INDEX. The first section 32 has a plurality of entries labeled 1 to N+1. Note that each entry may include more than one instruction. However, also note that the number of entries in first section 32 is not important for purposes of describing the invention and can be any number as appropriate for the particular application. Second section 34 and third section 36 has a number of entries corresponding to the number of entries of first section 32. Second section 34 stores the valid bits, and as mentioned above, the valid bits are used to perform a look-ahead function for instructions stored in first section 32. There is a valid bit in second section 34 corresponding to each entry in first section 32. The valid bit is asserted when the corresponding instruction is valid, and conversely, the valid bit is negated when the corresponding instruction is invalid.

For performing a look-ahead function, each INDEX is latched in latch 38 during a write operation to loop cache 26. The write signal controls multiplexer 40 and is provided by state machine 30. During the write operation, the second section 34 is addressed by the INDEX stored in latch 38. To provide the look ahead function, the INDEX stored in the latch is the previous instruction in a series of instructions, and is provided at the same time that a next INDEX is used to address first section 32. By way of example, if the index addresses an entry labeled N+1, as illustrated in FIG. 2, during a write operation, the multiplexer 40 output would address an entry corresponding to entry N, as depicted by the dashed line labeled "WRITE" pointing to entry N of second section 34.

During a read operation of loop cache 26, the write control signal WRITE from state machine 30 is negated and the next index is used to address first section 32, second section 34, and third section 36, as depicted in FIG. 2 using a solid arrow at entry N+1 of first section 32, second section 34, and third section 36. The instruction that is read corresponds to the present instruction address, while the valid bit corresponding to the next sequential instruction address is read at the same time with the same INDEX. Thus, providing the look ahead feature for instruction validity for the TAGless loop cache of data processing system 20.

Note that the look ahead feature may be used with any cache having a valid bit array, whether or not the cache is of a type having a TAG array. This allows selective activation of a next level of hierarchy in the memory system, such as the main memory 24 illustrated in FIG. 1, avoiding the need to automatically activate the next level for each access, which may result in significant reduction in power consumption of the data processing system. The look ahead feature also provides for the elimination of stalls in the instruction stream that may have been induced by a conventional primary cache lacking the look ahead feature, because the conventional cache may have to wait to if this the instruction is valid before it decides if it must access the next level of hierarchy in the memory system.

If the requested instruction is not stored in loop cache 26, an access to main memory is performed. At the same time that the instruction is provided to CPU 22, the instruction is also written to loop cache 26. When an entry is written into a location of first section 32, the corresponding valid bit is asserted indicating that the entry is valid and is placed in a location corresponding to a previous location of second section 34. A triggering SBB is a "taken" SBBI that causes activation of the loop cache. When a triggering SBB is detected, the SBB entry corresponding to the SBBI instruction is set in third section 36.

Only one entry in first section 32 can be marked with a triggering SBB bit at a time. This single triggering SBB bit is referred as the TRIGGERING SBB illustrated in FIG. 1.

Figure 3:
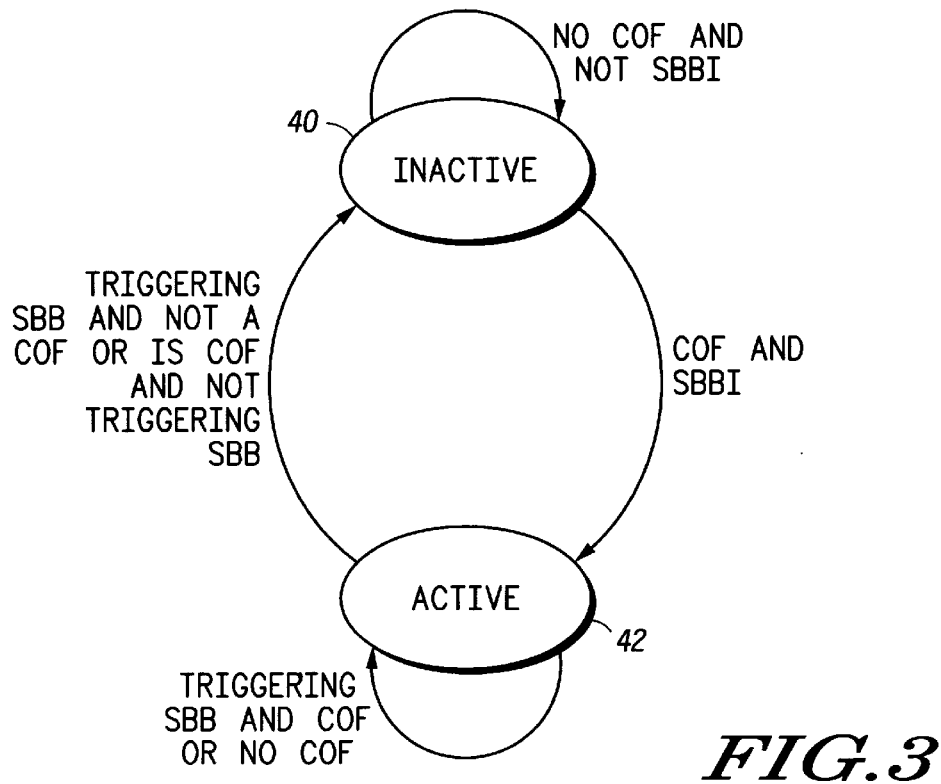
FIG. 3 illustrates a state diagram of the state machine of FIG. 1.

FIG. 3 illustrates a state diagram for describing the operation of state machine 30 in FIG. 1. As illustrated in FIG. 3, state machine 30 has two operating states: (1) an inactive state indicating that data is to be provided from main memory 24; and (2) an active state indicating that data can be provided from loop cache 26 to CPU 22. Also illustrated in FIG. 3 are the conditions which must be met for state machine 30 to transition from one state to another state or for state machine 30 to remain in its current state. For state machine 30 to transition from the inactive state 40 to the active state 42, the control bit COF from CPU 22 is asserted and the SBBI bit from CPU 22 is asserted. State machine 30 maintains loop cache 26 in active state 42 when there is a triggering SBB and an asserted COF or there is a negated COF. State machine 30 causes loop cache 26 to transition from active state 42 to inactive state 40 if there is a triggering SBB bit and a negated COF, or if COF is asserted and there is not a triggering SBB bit in second section 34. State machine 30 maintains loop cache 26 in the inactive state 40 if COF is negated or SBBI is negated.

Figure 4:
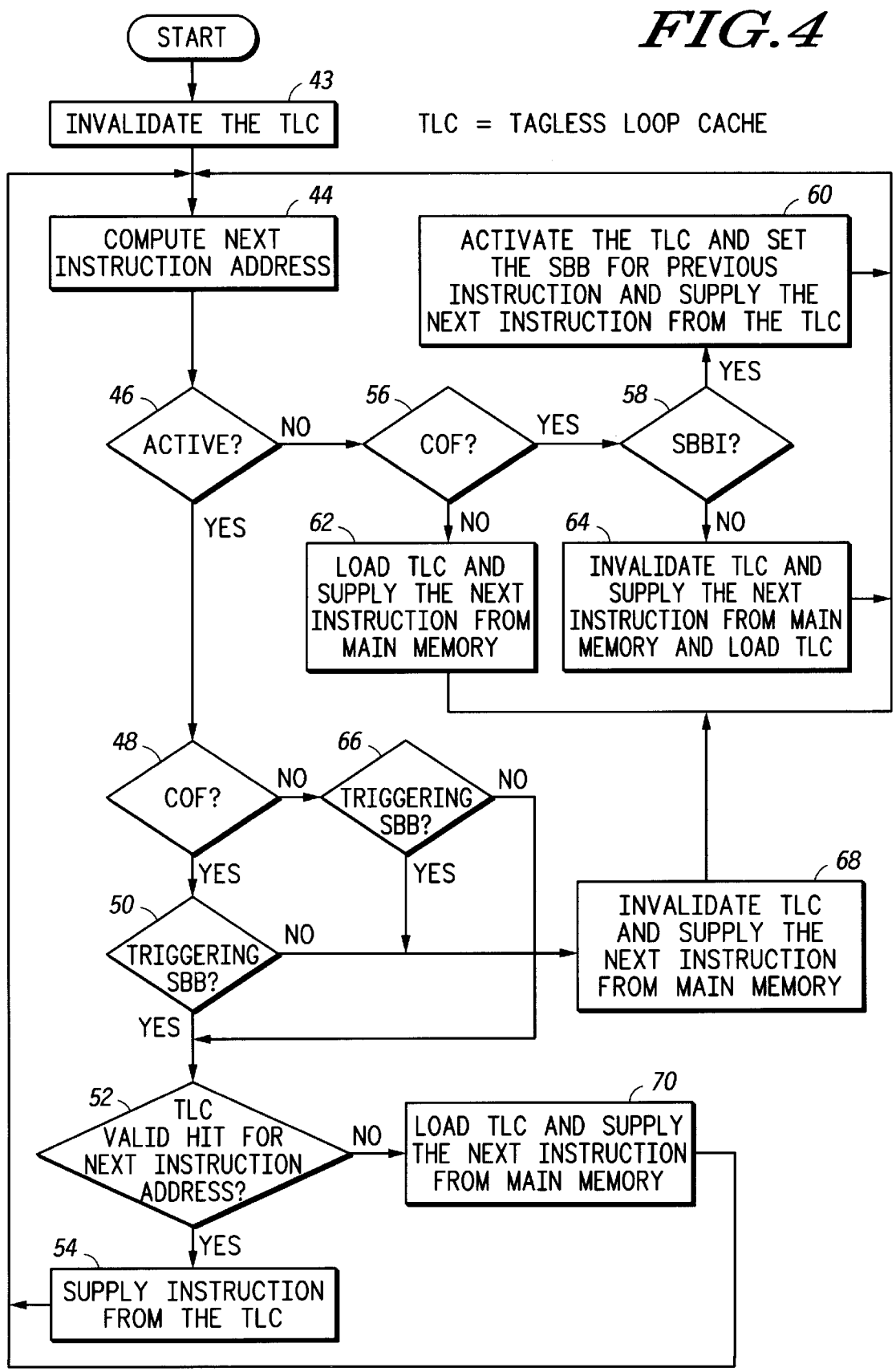
FIG. 4 illustrates a flow diagram of a method for activating a TAGless cache memory in accordance with the present embodiment.

FIG. 4 illustrates a flow diagram for accessing loop cache 26 of FIG. 1. At step 43, the loop cache is invalidated by negating all of the valid bit of second section 34. At step 44, CPU 22 computes the next instruction address. At step 46, it is determined if loop cache 26 is active. If loop cache 26 is active, the YES path is taken from decision step 46 to decision step 48. At decision step 48, it is determined if a previous instruction caused a change of flow (COF) in the series of instructions supplied by CPU 22. If there was a change of flow, the YES path is taken from decision step 48 to decision step 50. At decision step 50, it is determined if the COF is a triggering SBB. If the change of flow was caused by the backward branch instruction of less that the predetermined displacement, then the YES path is taken from decision step 50 to decision step 52. At decision step 52, it is determined if a next instruction corresponding to the next address is a valid instruction by looking at the valid bit corresponding to the next instruction. If the valid bit for the next instruction has been asserted, the YES path is taken from decision step 52 to step 54. At step 54, the instruction is supplied from the cache memory to CPU 22 to be executed.

However, at decision step 52, if the valid bit for the next instruction is not asserted, then the NO path is taken from decision step 52 to step 70. At step 70, the loop cache 26 is loaded from main memory with the next instruction, the next instruction is validated, and the next instruction is supplied to CPU 22 to be executed. Note that any time the loop cache is loaded with an instruction, the corresponding valid bit is set.

Referring back to decision step 50, if the change of flow instruction determined from decision step 48 was not a triggering SBB, the NO path is taken to step 68. At step 68, second section 34 (FIG. 2), which is the valid bit array, is invalidated and the next instruction is supplied to the CPU 22 from main memory and is loaded into loop cache 26. Also, the loop cache 26 is transitioned to inactive state 40 (FIG. 3). At step 68, the flow returns to the beginning of step 44 where the next instruction address is computed by CPU 22.

Referring back to decision step 48, if the previous instruction was not a change of flow, the NO path is taken to decision step 66. At decision step 66, it is determined if the previous instruction caused a backward branch of a predetermined displacement (triggering SBB) which activated the cache memory. If the instruction was not the triggering SBB, the NO path is taken from decision step 66 to decision step 52. If the previous instruction is a triggering SBB, the YES path is taken from decision 66 to step 68 and the flow continues from step 68, as described above.

Referring back to decision step 46, if the NO path is taken indicating that loop cache 26 is inactive, it is determined if there was a change of flow at decision step 56. If there was not a change of flow at decision step 56 for the previous address, the NO path is taken to step 62. At step 62, loop cache 26 is loaded with the next instruction while the next instruction is supplied from main memory to CPU 22. After step 62, the flow continues again at step 44.

Referring back to decision step 56, if the previous instruction was a change of flow, the YES path is taken to decision step 58. At decision step 58, it is determined if the short backward branch instruction (SBBI) was asserted by CPU 22 and provided to state machine 30. If the SBBI was not asserted, the NO path is taken to step 64 and loop cache 26 is invalidated, and loop cache 26 and CPU 22 are supplied with the next instruction from main memory 24. After step 64, the program flow continues again from step 44.

Referring back to decision step 58, if the instruction is indicated as being a short backward branch instruction, the YES path is taken to step 60. At step 60, loop cache 26 is activated and the SBB bit for the triggering branch instruction is set. Also, the next instruction is supplied from the loop cache 26 to CPU 22. After step 60, the program flow continues again at step 44. Note that these steps are repeated for each next instruction address until there are no more instruction addresses, at which time the program flow stops.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processing system, comprising:
   a central processing unit for generating instruction addresses and for processing instructions, one of the instructions corresponding to one of the instruction addresses;

a first memory, coupled to the central processing unit, for supplying and receiving the instructions;

a second memory, coupled to the central processing unit and to the first memory, for receiving and supplying the instructions; and a state machine, coupled to the central processing unit and to the second memory, for controlling when the second memory is active and inactive, the state machine receiving a control signal, and in response, causing the second memory to be active and supplying an instruction to the central processing unit without using an address comparison function.

2. The data processing system of claim 1, wherein the second memory comprises a first section for storing instructions, a second section for storing a valid bit, and a third section for storing a control bit, the control bit corresponding to the control signal, for indicating that a predetermined instruction activates the second memory to provide the instructions to the central processing unit.

3. The data processing system of claim 1, wherein a valid bit of a current instruction is stored at an instruction address of a previous instruction.

4. The data processing system of claim 1, wherein in response to the state machine causing the second memory to be inactive, supplying instructions to both the central processing unit and to the second memory from the first memory.

5. The data processing system of claim 4, wherein the central processing unit provides a first control signal to the state machine in response to determining that an instruction address is a non-sequential instruction address in a series of instruction addresses.

6. The data processing system of claim 5, wherein the central processing unit provides a second control signal to the state machine in response to detecting an instruction which causes the non-sequential instruction address to be a backward branch in the series of instruction addresses, the second control signal being asserted when a displacement of the backward branch is less than a predetermined displacement.

7. The data processing system of claim 6, wherein the second memory remains inactive when both the first and second control signals are negated.

8. The data processing system of claim 6, wherein the state machine uses asserted first and second control signals to cause the second memory to transition from an inactive state to an active state.

9. The data processing system of claim 8, wherein the second memory provides a third control signal to the state machine, which is determined by both asserted first and second control signals and the second memory being inactive, the third control signal for denoting the instruction which causes the backward branch.

10. The data processing system of claim 9, wherein the second memory remains in the active state when either the first and third control signals are asserted or the first control signal is negated.

11. The data processing system of claim 9, wherein the second memory transitions from the active state to the inactive state when either one of a first condition or a second condition is met, wherein the first condition being defined as the third control signal being asserted and the first control signal being negated, and the second condition being defined as the first control signal being asserted and the third control signal being negated.

12. A data processing system, comprising:

a central processing unit for generating instruction addresses and for processing instructions, one of the instructions corresponding to one of the instruction addresses;

a main memory, coupled to the central processing unit, for supplying and receiving data;

a cache memory, coupled to the central processing unit and to the main memory, for receiving the instructions, the cache memory comprising;

a first section for storing instructions; and a second section for storing valid bits, wherein the valid bit of a current instruction stored in the first section is stored in the second section at an instruction address of a previous instruction; and a state machine, coupled to the central processing unit and to the cache memory, for controlling when the cache memory is active and inactive, the state machine receiving a control signal, and in response, causing the cache memory to be active and supplying instructions to the central processing unit without using an address comparison function.

13. The data processing system of claim 12, further comprising a third section for storing a control bit for indicating that a predetermined instruction activates the cache memory to provide the instructions to the central processing unit.

14. The data processing system of claim 12, wherein during a read operation of the cache memory, the valid bit is read from a location using a current instruction address, and during a write operation of the cache memory, the valid bit is written to a location corresponding to a previous instruction address.

15. The data processing system of claim 12, further comprising a state machine coupled to the central processing unit and to the cache memory, wherein the central processing unit provides a first control signal to the state machine in response to determining that an instruction address is a non-sequential instruction address in a series of instruction addresses.

16. The data processing system of claim 15, wherein the central processing unit provides a second control signal to the state machine in response to detecting an instruction which causes a backward branch in the series of instruction addresses, the second control signal being active when a displacement of the backward branch is less than a predetermined displacement.

17. A method for storing instructions in a data processing system, the data processing system comprising a central processing unit, a main memory, and a cache memory, the method comprising the steps of:

invalidating the cache memory;

computing a next address for accessing either the main memory or the cache memory;

determining that the cache memory is active;

determining that a previous instruction has caused a change of flow in a series of instruction addresses supplied by the central processing unit;

determining that the previous instruction that caused the change of flow is a backward branch of a predetermined displacement that activated the cache memory;

determining that a next instruction corresponding to the next address is a valid instruction; and supplying the next instruction from the cache memory.

18. The method of claim 17, further comprising the steps of:

determining that the previous instruction is not the backward branch of the predetermined displacement that activated the cache memory; and invalidating the cache memory and supplying the next instruction from the main memory.

19. The method of claim 17, further comprising the steps of:

determining that the next instruction corresponding to the next address is an invalid instruction; and supplying the next instruction from the main memory to the central processing unit and loading the cache memory and with the next instruction.

20. The method of claim 17, further comprising the steps of:

determining that the previous instruction does not cause a change of flow in a series of instruction addresses supplied by the central processing unit;

determining that the previous instruction is not the backward branch of the predetermined displacement that activated the cache memory;

determining that the next instruction corresponding to the next address is a valid instruction; and supplying the next instruction from the cache memory to the central processing unit.

21. The method of claim 20, further comprising the steps of:

determining that the previous instruction is the backward branch of the predetermined displacement that activated the cache memory; and invalidating the cache memory and supplying the next instruction from the main memory.

22. A method for storing instructions in a data processing system, the data processing system comprising a central processing unit, a main memory, and a cache memory, the method comprising the steps of:

invalidating the cache memory;

computing a next address for accessing either the main memory or the cache memory;

determining that the cache memory is inactive;

determining that a previous instruction that does not cause a change of flow in a series of instruction addresses supplied by the central processing unit has been provided; and loading the cache memory with a next instruction from the main memory and supplying the next instruction to the central processing unit.

23. The method of claim 22, further comprising the steps of:

determining that a previous instruction that caused a change of flow in a series of instruction addresses supplied by the central processing unit has been processed;

determining that the previous instruction that caused the change of flow is not a backward branch of a predetermined displacement; and invalidating the cache memory and supplying the next instruction from the main memory.

24. The method of claim 22, further comprising the steps of:

determining that a previous instruction that caused a change of flow in a series of instructions addresses supplied by the central processing unit has occurred;

determining that the previous instruction that caused the change of flow is a backward branch of a predetermined displacement; and activating the cache memory and supplying the next instruction from the cache memory.

* * * * *